(12) United States Patent
Reverdy et al.

(10) Patent No.: US 6,431,449 B1
(45) Date of Patent: Aug. 13, 2002

(54) METHOD AND DEVICE FOR THE CHRONOLOGICAL REMOTE IDENTIFICATION AND MANAGEMENT OF MOBILE LABELS IN AN INTERROGATION FIELD

(75) Inventors: Jacques Reverdy, Crolles; Thierry Thomas, Varces, both of (FR)

(73) Assignee: Commissariat a l'Energie Atomique, Paris (FR)

( * ) Notice: Subject to any disclaimer, the term of this patent is extended or adjusted under 35 U.S.C. 154(b) by 80 days.

(21) Appl. No.: 09/671,244

(22) Filed: Sep. 28, 2000

(30) Foreign Application Priority Data

Oct. 14, 1999 (FR) .............................................. 99 12824

(51) Int. Cl.⁷ ............................................... G02B 26/10
(52) U.S. Cl. ................................................ 235/462.25
(58) Field of Search ...................... 235/162.01, 462.49, 235/472.01–472.03, 375, 494, 470, 468, 383, 442

(56) References Cited

U.S. PATENT DOCUMENTS

| | | | | |
|---|---|---|---|---|
| 3,949,363 A | * | 4/1976 | Holm ........................ 235/462 |
| 4,028,733 A | * | 6/1977 | Ulicki ........................ 360/10 |
| 4,044,227 A | * | 8/1977 | Holm ........................ 250/568 |
| 4,237,375 A | * | 12/1980 | Granholm ................... 235/437 |
| 4,687,912 A | * | 8/1987 | Ohta .......................... 235/462 |
| 4,795,281 A | * | 1/1989 | Ulinski ....................... 400/103 |
| 5,059,773 A | * | 10/1991 | Shimizu ...................... 235/462 |
| 5,262,626 A | * | 11/1993 | Goren et al. ................ 235/462 |
| 5,272,322 A | * | 12/1993 | Nishida et al. ............. 235/462 |
| 5,495,097 A | * | 2/1996 | Katz et al. .................. 235/462 |
| 5,754,823 A | * | 5/1998 | Mudryk, Jr. et al. ........ 395/500 |
| 6,003,773 A | * | 12/1999 | Durbin et al. ........... 235/462.45 |
| 6,237,850 B1 | * | 5/2001 | Kito ....................... 235/462.08 |

FOREIGN PATENT DOCUMENTS

| | | |
|---|---|---|
| EP | 0 568 066 | 11/1993 |
| GB | 2 335 573 | 9/1999 |

* cited by examiner

*Primary Examiner*—Thien M. Le
(74) *Attorney, Agent, or Firm*—Oblon, Spivak, McClelland, Maier & Neustadt, P.C.

(57) ABSTRACT

Labels (E) are identified by an interrogating system (5) in the order of their arrival in an interrogation field (3), which initializes and starts up a time counter (15) operated so as to prioritize the oldest label during identification. This prevents labels (E) passing through the interrogation field (3) without being able to transmit their identification code.

9 Claims, 2 Drawing Sheets

Figure 1:
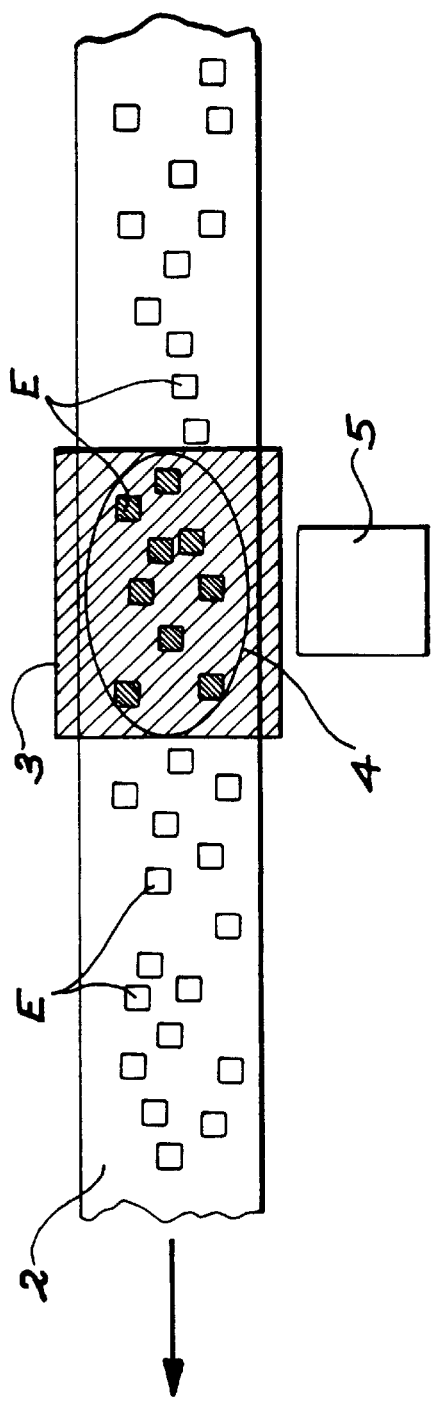

METHOD AND DEVICE FOR THE CHRONOLOGICAL REMOTE IDENTIFICATION AND MANAGEMENT OF MOBILE LABELS IN AN INTERROGATION FIELD

The present invention relates to a method for the remote identification of mobile labels in an interrogation field, as well as to a corresponding device.

Numerous technical fields now require remote identification of transceivers, each having a particular code permitting a distinction to be made between them. These devices are in principle connected to an object or person whose identification they permit, hence the name labels given to them. Reference can be made to personnel access control through a portico, the control of the passage of animals, the identification of baggage or objects on a conveyor, products or tools on a production line, as well as automatic tolls and sales.

When the labels approach an interrogating device, i.e. are included in its interrogation field, they indicate to it their code, after which various information exchanges known as transactions are possible between the interrogating device and the labels, as a function of the particular application. Normally the labels remain mobile during the transaction, their carrier continuing to move in front of the interrogating device and reference is the made to a "moving transaction". If other labels then pass through the interrogation field, they can only be interrogated subsequently, so that there is a risk of certain labels never being interrogated and can pass through the interrogation field without having been detected.

Various specific ways of identifying a plurality of active labels in the interrogation field have been envisaged. Thus, the interrogating device can make them recite their code in a fragmentwise manner and inhibit each label, i.e. render it provisionally inactive, when it does not supply a code fragment equal to a requested value. When only one active label remains its transaction can be completed and then the interrogating device returns to the inhibited labels, again renders them active and resumes the recital of their codes, requesting from them other fragment values in order to select a different one of them. Recommencement takes place until all the labels have supplied their code and the respective transactions have been completed. In another interrogation procedure, each of the labels present has an allocated transmission time defined in a random manner or on the basis of a number recorded therein. All the labels transmitting in a specific transmission time can be identified. The other labels are allocated a new transmission time. Identification is finished when all the labels have been able to individually transmit. In both cases the interrogation candidate labels can either be any random label present in the interrogation field or a given label batch present in the interrogation field at the start of the identification sequence. In the latter case, exclusively the labels of said batch are rendered active and interrogated and labels arriving during the identification sequence in the interrogation field will form part of the following batch. Each batch is formed either when the preceding batch has been used up (all its labels having been identified and processed) or after the processing of certain labels of the preceding batch or after a given time period. The labels of the preceding batch which have not been identified and processed must then form part of the new batch.

Certain interrogation algorithms have been proposed for the more rapid decoding of the codes. A proposal has consequently been made to read the codes starting alternately by the most significant bit and the least significant bit. As a result of these measures it is no longer necessary to always prioritize the same labels as a function of the value of their code, but they are only palliatives, because they do not permit a significant increase in the label passage rate through the interrogation field.

The object of the invention is to increase this authorized passage rate without risking detection absences by bringing about a substantial coincidence between the identification order of the labels and the entry order in the interrogation field.

Specifically the labels are provided with a time counter, which is initialized and started up on entering the interrogation field and then always interrogating the label which has spent the longest time in the interrogation field.

The invention consequently relates to a method for the individual identification of labels, each having a particular code, where the labels can pass in group form into an interrogation field of an interrogating device and where the interrogating device reads the code of each of the labels of the group, characterized in that each label of the group undergoes an initialization and starting of a presence time counter on entering the interrogation field, and in that the interrogating device firstly reads the code of the not yet identified label of the group having the longest presence time. It also relates to a device for the individual identification of labels, each provided with a particular code, comprising means for the transmission and reception of signals on an interrogating device and each of the labels, characterized in that the labels incorporate a time counter initialized and started up when it enters the interrogation field of the interrogating device and means for temporarily saving the presence times.

This method can be grafted onto all conventional procedures for the identification of labels or for the reading of the code, and more particularly those referred to hereinbefore.

Figure 2:
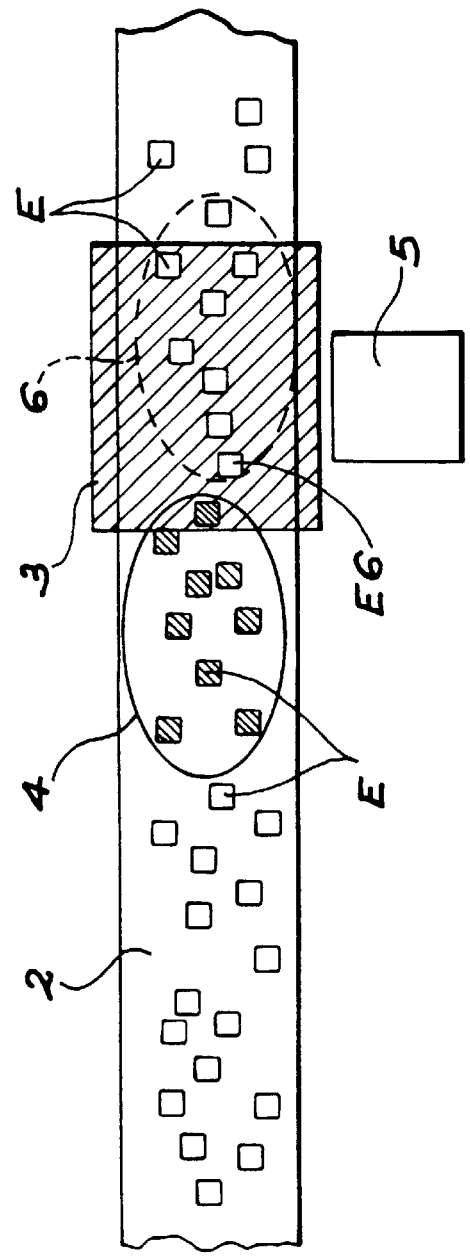

The invention is described in greater detail hereinafter relative to the attached drawings, wherein show:

FIGS. 1 and 2 Diagrammatically a system for the interrogation of labels at two successive moments.

Figure 3:
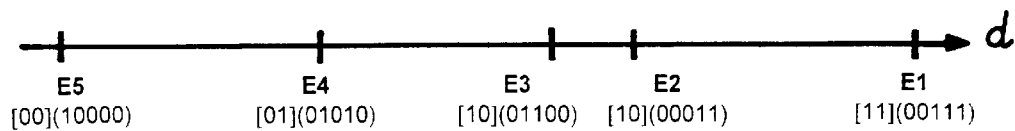

FIG. 3 An explanatory diagram.

Figure 4:
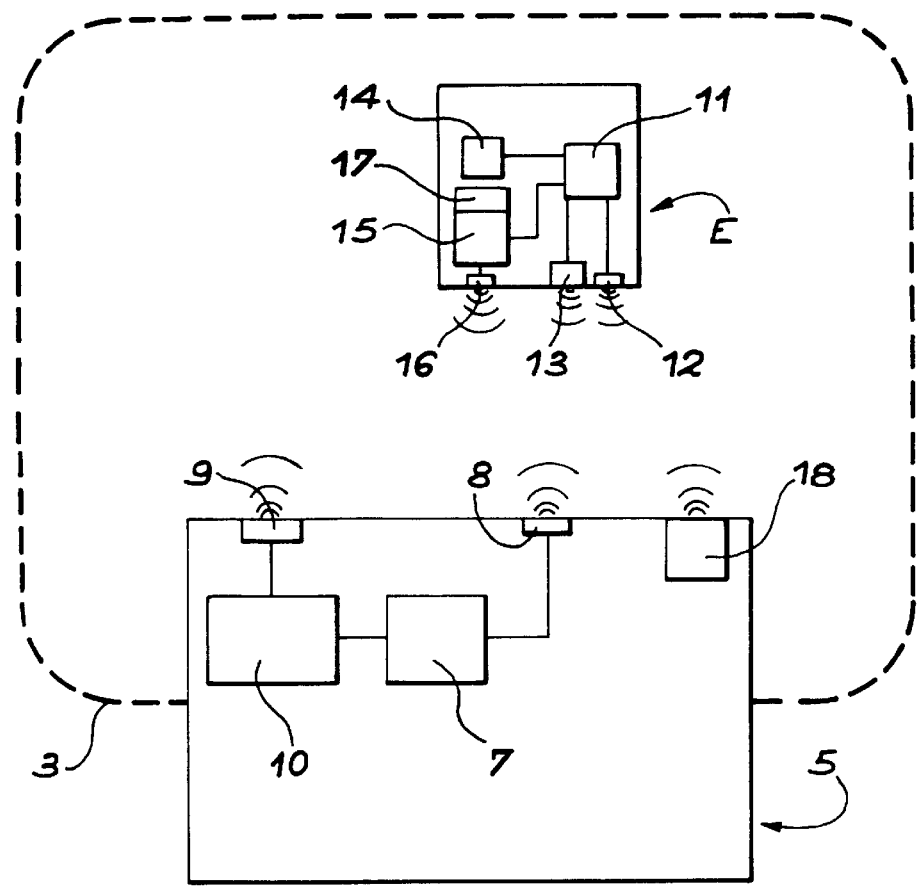

FIG. 4 The configuration of the equipment.

In FIG. 1 the labels are symbolized by squares carrying the reference E, their passage location by a corridor or track 2 and the interrogation field by a volume 3 extending over part of the length of the track 2. A description will be given more particularly in connection with the application of the invention to a method for the identification of labels E in batches or at certain times labels E present in the interrogation field 3 are rendered active. In this case a batch 4 of labels E includes all those surrounded by the closed line.

FIG. 2 illustrates the system at a later time. Labels E have moved and most of those of batch 4 have left the interrogation field 3, whilst others have entered it. As from the time of FIG. 1, the identification of the labels E has only related to those of batch 4 and it has been necessary to identify at least those which have left the interrogation field 3.

Each of the labels E e.g. has a numerical code formed from five bits for the identification thereof. In the hypothesis of FIG. 3, where there are five labels E1 to E5 of batch 4 remaining to be identified, the codes are indicated in brackets beneath each of the labels, which have been placed on an axis indicating the duration d since they have entered the interrogation field 3. Label E1 has entered first, followed by label E2 and so on up to label E5. Here the basic interrogation algorithm requests the labels E to recite their code bit by bit starting by the most significant. As the labels transmit at the same time, in the case of conflict, the labels transmitting a 0 are temporarily inhibited, so that firstly identification takes place of the not yet read label having the highest code, i.e. successively E5, E3, E4, E1 and E2. In particular the labels E1 and E2 present for a longer time and more advanced in the interrogation field 3 would escape detection if they had an excessive passage speed.

This is why, according to the invention, the basic algorithm is completed by measuring the presence time of each of the labels E in the interrogation field 3 and said time is expressed in the form of a time-variable, supplementary code element making it possible to firstly interrogate the not yet read label present for the longest time in the interrogation field 3. Here for example, said duration is expressed in the form of a two bit binary number placed between square brackets in FIG. 3 and consequently the label E1 is associated at said moment with the duration 11, labels E2 and E3 with 10, because they have entered virtually simultaneously the interrogation field, label E4 with 01 and label E5 with 00. Thus, the interrogating device 5 processes E1, then E3, then E2 (which is assumed as having the same presence time as E3, but which has a lower code value), then E4 and finally E5. Everything takes place as if the code of each of the labels was completed by a code fragment representing the residence time in the interrogation field 3 and whose value is preponderant for defining the interrogation or identification order. It is obvious that this principle can be applied to other identification processes. If identification firstly takes place of the label with the code having the lowest value, the presence time could be expressed by the decrease of one number rather than by its increase, as is the case here. If reading takes place starting with the bit or more generally the figure having the least significant value, the presence time could be expressed by a number which will be placed behind the code and whose figures will be placed in the reverse order. In all cases reading firstly takes place of the label having the longest presence time.

The same procedure can be adopted for identification methods other than using batches and for methods where labels are interrogated sequentially (the presence time being used for allocating a transmission time to each label), because the principle remains the same, namely count the presence time and interrogate the labels which have arrived first.

When a label has been identified, it is possible to block its presence time counter or allow it to evolve up to saturation, which can be useful if other transactions have to take place later, because it will be possible to once again sequence them on the basis of the presence time. The interrogating device can also store the arrival order of the labels in the interrogation field. In all cases, the presence time counter must not be reinitialized when the label is present in the interrogation field.

The method according to the invention significantly increases the passage rate of labels E which can be adopted. On returning to FIG. 2, reference number 6 is used for designating the batch following batch 4 and which will include all the new labels E which will then be present in the interrogation field 3. The first label E6 of batch 6, which has entered very soon after the formation of batch 4, will be examined first in accordance with the present invention and could thus be virtually located at the exit of the interrogation field 3 when batch 6 has been formed. With conventional methods where the labels of batch 6 are identified in an unknown order, there would be a risk of label E6 being identified last and would consequently have not passed beyond the first half of the interrogation field 3 at the end of the identification sequence of batch 4. In this situation where it is assumed that the labels E all move at a known speed, the invention makes it possible to double the possible passage rate for the labels E. A significant benefit can be expected if the labels E can move at different or variable speeds.

A brief description will now be given of the device used and the latter is shown in FIG. 4. In conventional manner the interrogating device 5 comprises a signal generator 7 transmitting signals into the interrogation field 3 by means of a transmitter 8 and also comprises at least one receiver 9 collecting the signals transmitted by the labels E and connected to a reading device 10, which analyzes the signals received and makes it possible to return others to the labels E by means of the signal generator 7 in order to complete the necessary transactions. The labels E incorporate a control device 11 connected to a receiver 12 and a transmitter 13 and which respectively communicate with the transmitter 8 and receiver 9 of the interrogating device 5, as well as a memory 14 containing the code of label B and which the control device 11 can read and transmit to the interrogating device 5. Another memory can be added for containing other informations which could form the object of the transaction. In addition, each label E incorporates a counter 15, allocated to the measurement of time, which is dependent on a receiver 16 sensitive to a radio frequency signal supplied by a transmitter 18 suitable for the interrogating device 5. As soon as the label E enters the interrogation field 3, the counter 15 receives the pulses from the radio frequency signal, so that said counter is initialized and starts up counting said pulses. It can operate like a frequency divider, i.e. its count is only modified by one unit when a given number of radio frequency pulses has reached it. No matter what the situation, it is also connected to the control device 11, which can read and temporarily store its content.

The time base can also be placed on the labels E. The counter 15 will then be sensitive to the signal of an internal oscillator 17 connected thereto.

Although the invention has been conceived for the identification by the reading of a code, it can also be applied to the reading of any information on labels E in a judicious order. In this case, following identification of the labels, it is advantageous for the interrogating device to store the presence times of the labels.

In the case of objects moving by means of a conveyor or some other means permitting a linear, identical movement of the labels, the invention also makes it possible to bring about a reciprocal positioning of the labels, said information being important when a physical sorting is necessary after identification.

It has been assumed here that batches 4 and 6 were separate. They could also have a common part if batch 6 was defined before all the labels of batch 4 had been identified.

What is claimed is:

1. Method for the individual identification of labels (E), each having a particular code, where the labels can pass in group form into an interrogation field (3) of an interrogating device (5), where the latter reads the code of each of the labels of the group, characterized in that each label of the group undergoes an initialization and a starting up of a presence time counter (15) on entering the interrogation field (13), and in that the interrogating device firstly reads the code of the label having the longest presence time among the unidentified labels.

2. Method according to claim 1, the displacement being linear and identical for all the labels, said method also including a location stage on the displacement axis of the labels identified as a function of their presence time.

3. Method according to claim 1, characterized in that the interrogation relates to successive label batches (4) of the group, it being possible to modify the size and content of the batches following the identification of at least one label.

4. Method according to claim 1, characterized in that the presence times are expressed in digital form as codes and in that the interrogating device reads, for each of the labels, the presence time and the code as a single number formed from digits, the digits associated with the presence time being preponderant for deciding the label reading order.

5. Method according to claim 1, where each label transmits its entire identification code during a time interval allocated to it and whose order number is defined in priority form as a function of the presence time of the label in the interrogation field.

6. Device for the individual identification of labels (E), each having a particular code, comprising transmission and reception means (8, 9, 12, 13) for signals on an interrogating device and each of the labels, characterized in that each label incorporates a time counter (15) initialized and starting when it enters the interrogation field and means (10) for reading the time counter (15) and temporarily saving the presence time.

7. Device according to claim 6, characterized in that the time counter incorporates a signal frequency divider.

8. Device according to claim 7, the signal being supplied by the interrogating device.

9. Device according to claim 6, characterized in that the labels incorporate an internal oscillator (17) connected to the time counter (15).

* * * * *